3,032,519
WHITE SIDEWALL FOR A PNEUMATIC TIRE
Harvey J. Batts, Indianapolis, Ind., assignor to United States Rubber Company, New York, N.Y., a corporation of New Jersey
No Drawing. Filed June 24, 1958, Ser. No. 744,080
5 Claims. (Cl. 260—23.7)

This invention relates to pneumatic tires and more particularly it relates to a white sidewall for a pneumatic tire comprised of a butyl rubber composition, which sidewall is superior to previous butyl rubber sidewalls, by reason of its hard, smooth, and slick surface.

The butyl rubber white sidewall of the present invention is non-tacky, has reduced tendency to soil under the conditions of driving, it has improved ease of cleaning once soiled, and it has improved hardness, with resulting improved buffability and scuffability. Previously known butyl rubber white sidewall compositions have been deficient in the foregoing respects, with the result that more general acceptance of butyl rubber sidewalls has been retarded. The invention overcomes the shortcomings of conventional butyl rubber white sidewall stocks by including in the stock an ester of a glycol with a carboxylic acid. The glycol may be ethylene glycol, propylene glycol or tetramethylene glycol, or a polymer thereof such as diethylene glycol, triethylene glycol, or higher polymers such as the polyethylene glycols having average molecular weights of from 200 to 6000. The acid is preferably a monocarboxylic acid and typically contains from 10 to 20 carbon atoms. It may be a fatty acid as in the case of lauric acid or stearic acid, or it may be unsaturated as in the case of oleic acid. Typical esters suitable for use in the invention are as follows:

Ethylene glycol monostearate
Diethylene glycol monolaurate
Propylene glycol monostearate
Polyethylene glycol (avg. mol. wt. 200) monolaurate
Polyethylene glycol (4000) dioleate
Polyethylene glycol (600) monostearate
Polyethylene glycol (400) distearate
Polyethylene glycol (600) monolaurate Ethylene glycol monostearate is preferred.

From 3 to 15 parts by weight, and preferably from 5 to 10 parts, of the glycol ester are usually employed, per 100 parts by weight of butyl rubber.

The term "butyl rubber" is of course used herein in its usual conventional sense as referring to the isobutylene: isoprene copolymer type of synthetic rubber. Other isoolefins besides isobutylene, or other polyunsaturated monomers besides isoprene may be used in the manufacture of butyl rubber, and the butyl rubber copolymer may include halogens such as chlorine or bromine. Such modified forms of butyl rubber may of course be used in the invention. (For a more full description of butyl rubber, see, for example, U.S. Patent 2,829,132, Tawney et al., April 1, 1958.)

The formulation of the butyl rubber white sidewall stock of the invention otherwise follows conventional practice, and may include the usual fillers or pigments, antioxidants, processing aids, vulcanizing ingredients etc. The fabrication of the stock into a sidewall strip and the incorporation of such sidewall strip into a pneumatic tire also follow conventional practice, as described in numerous issued patents, and therefore requires no detailed exposition here.

In a preferred form of the invention the butyl rubber white sidewall stock further includes a quantity of chlorosulfonated polyethylene elastomer (as described in copending application of Peterson and Batts Serial No. 717,597 filed February 26, 1958, now abandoned), but this feature is optional.

The following examples, in which all parts are expressed by weight, will serve to illustrate the invention in more detail.

Examples 1–3

Banbury mixed to 340° F.

| Formulation | 1 | 2 | 3 |
|---|---|---|---|
| Isobutylene—Isoprene copolymer rubber ("Butyl 365" made by Esso Corp.) | 100.00 | 100.00 | 100.00 |
| Silica filler ("Hi Sil 233" made by Pittsburgh Plate Glass) | 45.00 | 45.00 | 45.00 |
| Stearic acid | 1.25 | 1.25 | 1.25 |
| N-methyl-N′, 4-dinitrosoaniline (33% active material). ("Elastopar," made by Monsanto) | 1.20 | 1.20 | 1.20 |

Banbury mixed to 300° F.

| | 1 | 2 | 3 |
|---|---|---|---|
| Titanium oxide pigment ("Titanox FF" made by Titanium Pigment Corp.) | 50.00 | 50.00 | 50.00 |
| Zinc oxide | 10.00 | 10.00 | 10.00 |
| Blue pigment | .30 | .30 | .30 |
| Antioxidant (phenyl-beta-naphthylamine) | 2.00 | 2.00 | 2.00 |
| Ethylene glycol monostearate | 5.00 | | |
| Diethylene glycol stearate | | 5.00 | |
| Polyethylene glycol 400 dioleate | | | 5.00 |

Sulfured on mill

| | 1 | 2 | 3 |
|---|---|---|---|
| Tetramethyl thiuram disulfide ("Tuex" made by Naugatuck Chemical) | 2.00 | 2.00 | 2.00 |
| Mercaptobenzothiazole (Captax made by Naugatuck Chemical) | 1.25 | 1.25 | 1.25 |
| Triethanolamine | 1.25 | 1.25 | 1.25 |
| Sulfur | 2.50 | 2.50 | 2.50 |

It was immediately apparent that this type of compound did the things by way of correction to the butyl which had long been sought. The ethylene glycol monostearate was superior and outstanding; however, the other two glycol ester compounds were operable. These materials were also found to fill the roll of plasticizer during processing.

| Test Data: | Cure at 340° F., min. | 1 | 2 | 3 |
|---|---|---|---|---|
| Tensile | 15 | 1,845 | 1,520 | 1,585 |
| | 20 | 1,740 | 1,500 | 1,670 |
| | 25 | 1,600 | 1,465 | 1,350 |
| | 30 | 1,625 | 1,470 | 1,470 |
| Elongation | 15 | 670 | 570 | 640 |
| | 20 | 600 | 530 | 630 |
| | 25 | 580 | 520 | 580 |
| | 30 | 570 | 530 | 600 |
| 300% modulus | 15 | 580 | 495 | 390 |
| | 20 | 625 | 545 | 410 |
| | 25 | 585 | 555 | 450 |
| | 30 | 650 | 530 | 415 |
| Hardness durometer A | 15 | 68 | 62 | 62 |
| | 20 | 68 | 64 | 63 |
| | 25 | 69 | 65 | 68 |
| | 30 | 70 | 65 | 66 |

Examples 4–8

These examples demonstrate the superiority of ethylene glycol monostearate over a high molecular weight ethylene glycol (Carbowax 6000 made by Carbide and Carbon). The high molecular weight material was used in order that a solid material might be compared to the ethylene glycol monostearate which is a solid. Low molecular weight glycols are liquids and might be expected to soften the butyl matrix to a greater extent.

Mixed to and held 3 minutes at 300° F.

| Formulation | 4 | 5 | 6 | 7 | 8 |
|---|---|---|---|---|---|
| "Butyl 365" | 100.00 | 100.00 | 100.00 | 100.00 | 100.00 |
| "Hi Sil 233" | 45.00 | 45.00 | 45.00 | 45.00 | 45.00 |
| Stearic acid | 1.25 | 1.25 | 1.25 | 1.25 | 1.25 |
| "Elastopar" | .80 | .80 | .80 | .80 | .80 |
| "Carbowax 6000" | 5.00 | 10.00 | | | |
| Ethylene glycol monostearate | | | 5.00 | 10.00 | 5.00 |

Unloaded at 300° F.

| | 4 | 5 | 6 | 7 | 8 |
|---|---|---|---|---|---|
| Titanium oxide pigment | 50.00 | 50.00 | 50.00 | 50.00 | 50.00 |
| Zinc oxide | 10.00 | 10.00 | 10.00 | 10.00 | 10.00 |
| Polyethylene | 12.50 | 12.50 | 12.50 | 12.50 | |
| Blue pigment | .30 | .30 | .30 | .30 | .30 |

Sulfured on a cool mill

| | 4 | 5 | 6 | 7 | 8 |
|---|---|---|---|---|---|
| Triethanolamine | 1.25 | 1.25 | 1.25 | 1.25 | 1.25 |
| "Tuex" | 1.88 | 1.88 | 1.88 | 1.88 | 1.88 |
| Benzothiazyl disulfide ("Altax" made by Vanderbilt) | 1.25 | 1.25 | 1.25 | 1.25 | 1.25 |
| Sulfur | 1.50 | 1.50 | 1.50 | 1.50 | 1.50 |

Polyethylene is added in the second stage mix. This is a conventional step taken to assist in obtaining the desired characteristics in a white sidewall butyl compound. It is common to the first four batches (4–7). It is removed from the fifth batch (8) to demonstrate the effect of the ethylene glycol monostearate alone.

| Test Data: | Cure at 340° F., min. | 4 | 5 | 6 | 7 | 8 |
|---|---|---|---|---|---|---|
| Tensile | 5 | 1,470 | 1,365 | 1,550 | 1,330 | 1,640 |
| | 10 | 1,670 | 1,370 | 1,630 | 1,630 | 1,710 |
| | 15 | 1,680 | 1,500 | 1,710 | 1,600 | 1,730 |
| | 20 | 1,710 | 1,555 | 1,650 | 1,605 | 1,690 |
| | 30 | 1,720 | 1,485 | 1,650 | 1,660 | 1,710 |
| | 45 | 1,570 | 1,400 | 1,520 | 1,300 | 1,590 |
| Elongation | 5 | 860 | 880 | 840 | 880 | 900 |
| | 10 | 820 | 790 | 780 | 810 | 830 |
| | 15 | 790 | 700 | 760 | 740 | 780 |
| | 20 | 770 | 750 | 720 | 740 | 740 |
| | 30 | 750 | 740 | 710 | 730 | 730 |
| | 45 | 690 | 700 | 700 | 640 | 710 |
| 300% modulus | 5 | 275 | 270 | 275 | 370 | 320 |
| | 10 | 355 | 310 | 460 | 415 | 400 |
| | 15 | 390 | 350 | 500 | 470 | 435 |
| | 20 | 405 | 370 | 525 | 475 | 460 |
| | 30 | 405 | 380 | 550 | 515 | 490 |
| | 45 | 440 | 375 | 550 | 490 | 480 |
| Hardness Shore A | 5 | 63 | 63 | 67 | 70 | 65 |
| | 10 | 66 | 65 | 72 | 73 | 69 |
| | 15 | 68 | 69 | 73 | 73 | 71 |
| | 20 | 69 | 69 | 75 | 76 | 72 |
| | 30 | 72 | 70 | 77 | 78 | 76 |
| | 45 | 70 | 67 | 75 | 73 | 74 |

The superiority of ethylene glycol monostearate is clearly evident from the above data. Such compounds have been rather extensively tested on road tests. The findings are that they soil less easily and once dirty they clean easily.

These are the goals sought. They are made possible in part by the improved buffing characteristics of such compounds, and in part by the elimination or reduction of tack. Conventional butyl compounds loaded with mineral fillers become increasingly tacky in service, especially in sunlight.

The surface of the white sidewall of the invention is of remarkably superior appearance, and gives the impression of having been cured in a chromium plated mold and not buffed. Even after the tire was passed through an automatic buffing machine, no traces of buffing are apparent. The buffed compound presents a hard, smooth, slick surface. Major advantages of the white sidewall of the invention may be summarized as follows:

(1) "Drying" the vulcanizate, i.e., elimination of the tackiness inherent in butyl compounds and especially white butyl compounds, (2) Reducing the tendency of white butyl to soil under the conditions of normal driving, (3) Improving the ease of cleaning once soiled, (4) Improving the hardness of the compound and therefore the buffability and scuffability. Such advantages have hitherto been largely unknown in a butyl rubber white sidewall.

Having thus described my invention, what I claim and desire to protect by Letters Patent is:

1. A method of rendering a white sidewall for a pneumatic tire substantially non-tacky in use, more resistant to soiling, and more easily cleaned, comprising mixing 100 parts of isobutylene:isoprene copolymer rubber, and from 5 to 10 parts of an ester of a glycol selected from the group consisting of ethylene glycol, propylene glycol, tetramethylene glycol, and polymers thereof having an average molecular weight up to 6000, with a monocarboxylic acid containing from 10 to 20 carbon atoms, the said parts being by weight, the said mixture containing white pigment and vulcanizing ingredients, shaping the said mixture into the form of a tire sidewall, applying said sidewall to a pneumatic tire, and vulcanizing the resulting assembly.

2. A method as in claim 1 in which the said ester is ethyleneglycol monostearate.

3. A method as in claim 1 in which the said ester is an ester of ethylene glycol.

4. A method as in claim 1 in which the said ester is an ester of polyethylene glycol having a molecular weight of from 200 to 6000.

5. A method as in claim 1 in which the said ester is an ester of stearic acid.

References Cited in the file of this patent

UNITED STATES PATENTS 2,399,262     Thomas et al.     Apr. 30, 1946
2,734,039     Peterson et al.     Feb. 7, 1956